Nov. 9, 1926.

E. L. SCHELLENS ET AL 1,606,389

RAILWAY TRUCK

Filed July 21, 1922

WITNESS
Gustav Genzlinger.

INVENTORS
J. S. Coffin, Jr.
E. L. Schellens
BY
ATTORNEYS

Patented Nov. 9, 1926.

1,606,389

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE, ASSIGNORS, BY DIRECT AND MESNE ASSIGNMENTS, TO C-S ENGINEERING COMPANY, A CORPORATION OF DELAWARE.

RAILWAY TRUCK.

Application filed July 21, 1922. Serial No. 576,619.

This invention relates to trucks for railway vehicles, such for example, as a trailer truck of locomotives, and it has for one of its primary objects the provision of a very simple, light but rigid construction of truck in which standard, merchant sections may be employed, thus effecting economy and a reduction in weights.

Another object of the invention is the provision of a truck of the character described in which maximum clearance for the ash pan and also for the application of a booster motor is provided.

The foregoing, together with such other objects as may hereinafter appear or are incident to our invention, we obtain by means of a construction which we have illustrated in preferred form in the accompanying drawings, wherein.

In accordance with our invention we provide pedestal construction 7 having jaws 8 and laterally extending bracket-like lug portions 9, all preferably made integral, and the jaws 8 being quite long so that the pedestal has considerable overall depth. The pedestals and the members 10 constitute the truck frame.

Figure 1:
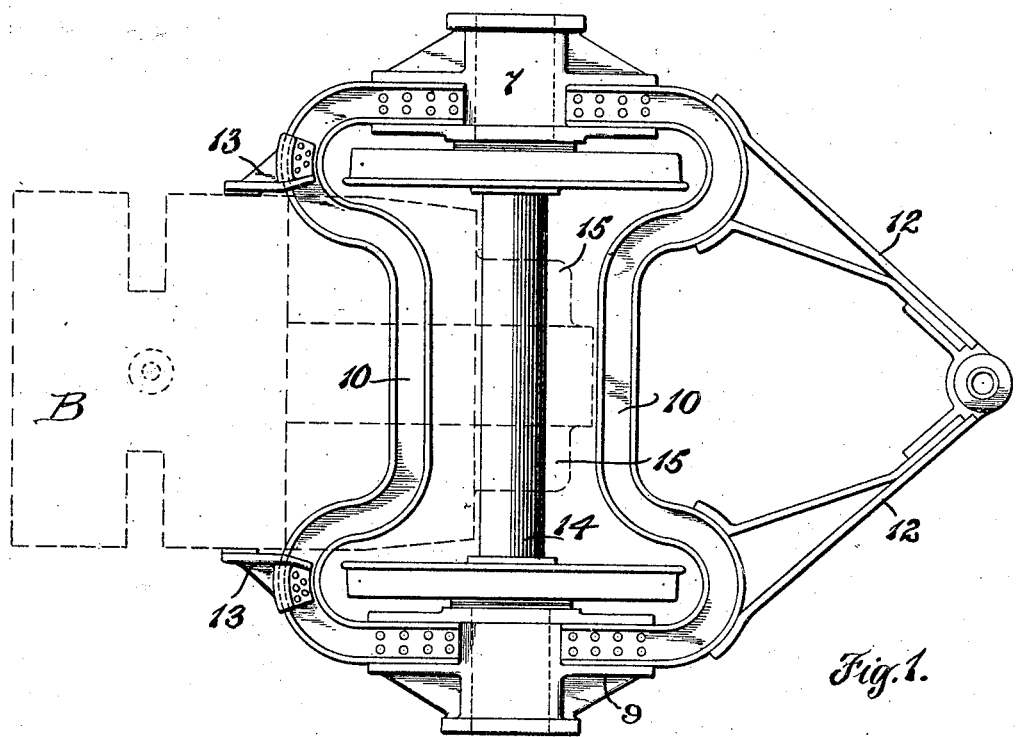
Fig. 1 is a plan view of a truck embodying our improvement.
Figure 2:
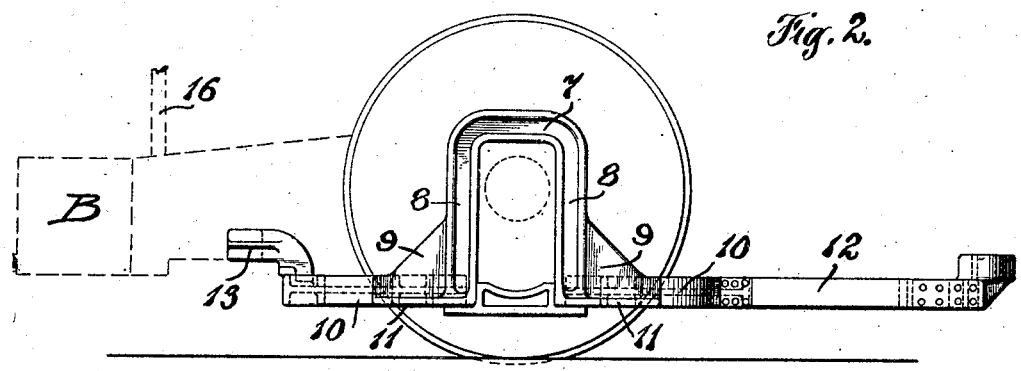
Fig. 2 is a side elevation of the truck illustrated in Fig. 1.

The members 10 are preferably composed of standard merchant channel sections bent into the shape indicated in Fig. 1, the ends of the sections being riveted or otherwise secured to the seat portions 11 of the members 9.

The radius bars 12 which afford pivotal connection to the locomotive structure are secured to the front frame member 10, while the rear member 10 is provided with a pair of chafing plates 13 adapted to afford lateral support for the booster motor B, maintaining the same in alignment with the axle 14, but permitting the booster motor to rock vertically as the conditions of service may demand.

It will be understood that the booster, if applied to such a truck is in part supported on the axle 14 by suitable bearings diagrammatically indicated at 15, and in part suspended from the locomotive frame by means of the link 16 or other form of suspension means such as shown, for example, in our copending application, Serial No. 576,616, filed July 21, 1922.

By the use of a deep pedestal, the level of the member 10 is dropped well down below the center of the axle, thus providing maximum clearance in the front for the fire box ash pan, and in the rear for the application of the booster motor. These clearances are further increased by bending the channels 10 inwardly around the wheels toward the axle. The deep pedestal also makes it possible to interchangeably use wheels of different diameters by interposing plates between the journal box and pedestal.

Referring now more particularly to the pedestal, it will be seen that the lug members 9 comprise two-spaced ribs and the connecting base portion 11 so that such members, in effect, constitute channel-like portions receiving the ends of the frame member 10, the construction being such as to lend great rigidity and strength to the frame, considered as a whole; the rigidity being increased by the conformation of the frame members 10 themselves.

It will be noted that the truck is capable of a very wide range of application and may be used as a simple truck or as a booster driven truck.

Other advantages will occur to those familiar with the art.

What we claim is:—

1. A railway truck comprising in combination an axle and wheels, a frame, and chafing means on the frame adapted to afford lateral support for a booster motor.

2. A railway truck comprising in combination an axle and wheels, pedestals having at their lower ends projecting channel shaped lug or bracket-like portions, and a frame member having its ends secured in the channel shaped bracket portion of the respective pedestals and tying the pedestals together.

3. A railway truck comprising in combination an axle and wheels, vertically deep pedestals, and a frame member secured to the bottom portions of the pedestals having its end portions of a U-shape to embrace the wheels and its middle portion adjacent the axle.

4. A railway truck comprising in combination an axle and wheels, axle-boxes, a frame member, and pedestals at the bottom of which the frame member is secured, said pedestals being of substantially greater vertical depth than required by the axle-box motion, so that, regardless of the employment of wheels of substantially different diameters, the axle-boxes may be so positioned vertically in said pedestals that said frame member will be maintained at a predetermined minimum height above the rails.

5. A railway truck comprising, in combination with an axle and wheels, a frame composed of pedestals and transverse frame members secured to the bottom of the pedestals, said pedestals being of substantially greater vertical depth than required by the axle-box motion so that the frame members lie in a plane substantially below the axle, and said transverse frame members being bent inwardly between the wheels toward the axle.

In testimony whereof, we have hereunto signed our names.

E. L. SCHELLENS.
J. S. COFFIN, Jr.